May 5, 1925.
W. N. BOOTH
1,536,373
DEVICE FOR EXPANDING AND CONTRACTING DEMOUNTABLE RIMS
Filed Sept. 3, 1921 2 Sheets-Sheet 1
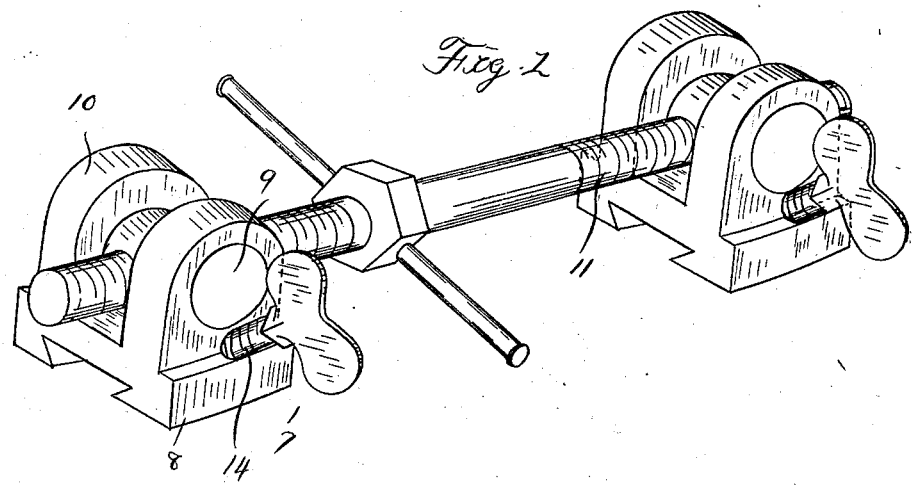
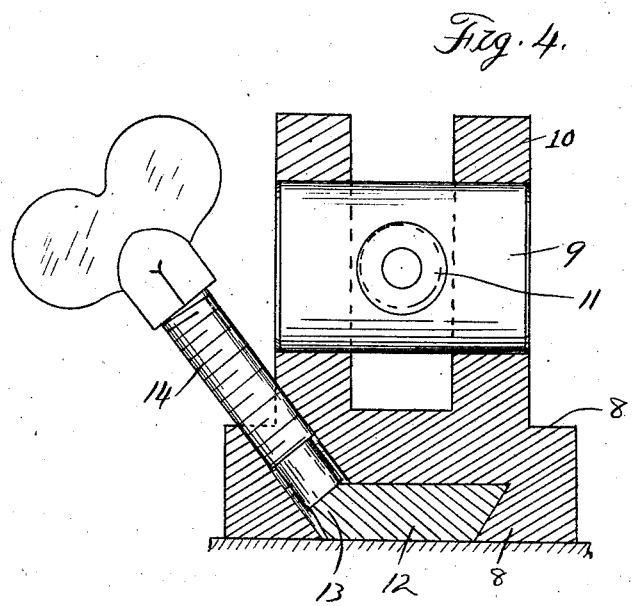
Inventor
William N. Booth May 5, 1925.  
W. N. BOOTH  
1,536,373  
DEVICE FOR EXPANDING AND CONTRACTING DEMOUNTABLE RIMS  
Filed Sept. 3, 1921  
2 Sheets-Sheet 2

Inventor  
William N. Booth  
By Whittemore Hulbert Whittemore  
+Belknap   Attorneys Patented May 5, 1925.

1,536,373

UNITED STATES PATENT OFFICE.

WILLIAM N. BOOTH, OF DETROIT, MICHIGAN.

DEVICE FOR EXPANDING AND CONTRACTING DEMOUNTABLE RIMS.

Application filed September 3, 1921. Serial No. 498,318.

*To all whom it may concern:*

Be it known that I, WILLIAM N. BOOTH, a citizen of the United States of America, residing at Detroit, in the county of Wayne and State of Michigan, have invented certain new and useful Improvements in Devices for Expanding and Contracting Demountable Rims, of which the following is a specification, reference being had therein to the accompanying drawings.

The invention relates to devices for expanding and contracting transversely split demountable rims and is particularly applicable to rims which are used with the larger sized pneumatic tires for trucks and the like. The invention has for its object the provision of a tool which is detachably engageable with a transversely split rim section and which is simple and strong in construction as well as easily operated. Other objects of the invention reside in the novel features of construction as more fully hereinafter set forth.

In the drawings:

Figure 1 is a perspective view of a rim expanding and contracting tool embodying my invention;

Figure 4 is a cross section through one of the anchors.

Figure 3:
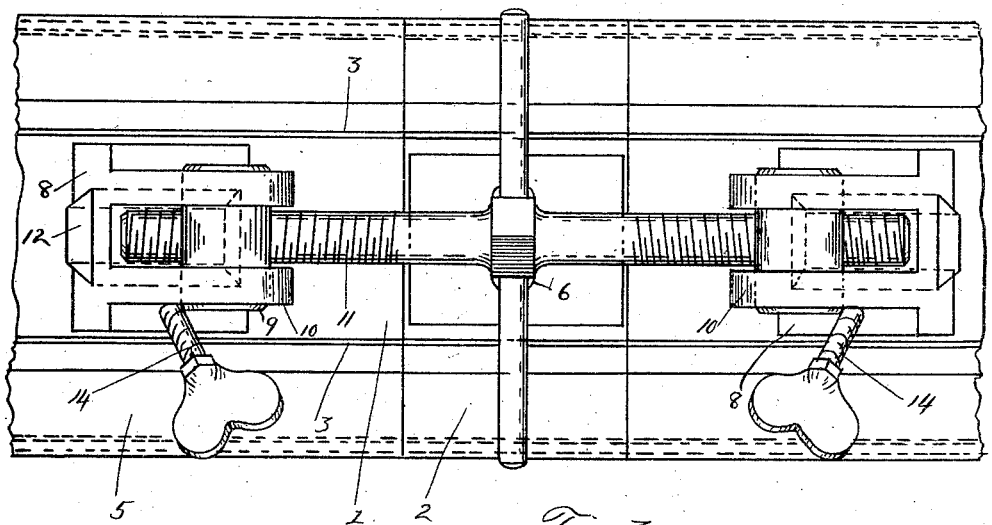
Figure 3 is a plan view thereof.
Figure 2:
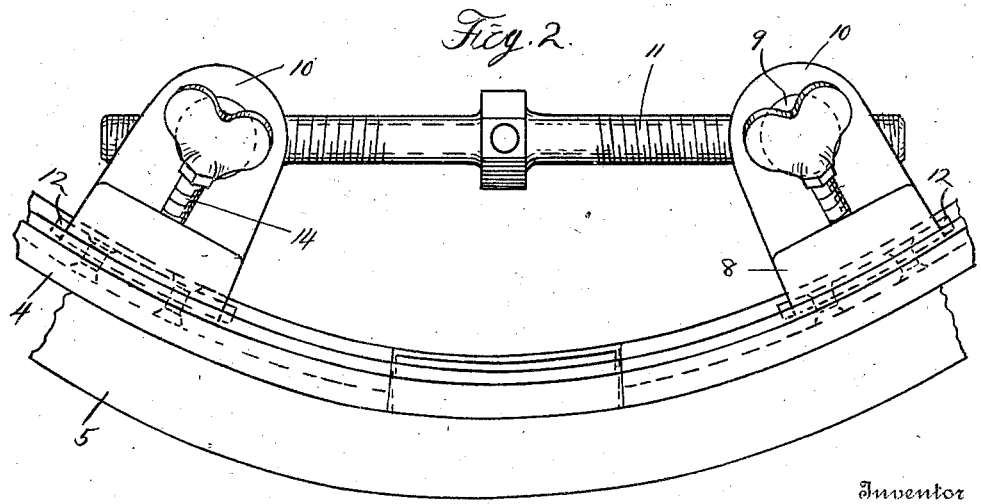
Figure 2 is a side elevation thereof and shown in place upon a demountable rim.

As shown in the present instance, the demountable rim is designed particularly for use with the larger sized pneumatic tires for trucks and the like, and comprises the transversely split main section 1 and the filler section 2 fitting between the ends of the main section. Both the main and filler sections have upon their inner peripheries, the pair of registering beads 3 adapted to seat upon the fixed rim of the vehicle wheel and the side flanges 4 adapted to engage the tire retaining rings 5. The filler section has the elongated aperture 6 which extends transversely of the inner tube so that when the filler section has been removed from between the ends of the main section, the latter can be contracted to bring its ends adjacent to the air valve at which time the diameter of the main section is reduced sufficiently to permit of the passing of the tire retaining rings and tire thereover.

7 is the expanding and contracting tool for moving the ends of the main section away from and toward each other. This tool comprises the pair of anchors 8 adapted to be detachably secured to the main section 1 near its ends, the pivots 9 extending transversely of and journalled in the bifurcations 10 upon the anchors, and the threaded rod 11 having right and left handed threaded ends respectively engaging in the pivots journalled in the anchors.

For securing the anchors to the main section, there are the curved plates 12 secured to the inner periphery of the main section near its ends and having under-cut side edges which are slidably engaged by correspondingly shaped over-hanging side edges upon the anchors, the arrangement being such that the anchors have a sliding dove-tailed engagement with the plates. The lower faces of these anchors have a radius of curvature substantially equal to that of the demountable rim, which is also true of the dove-tailed slots formed in the lower faces of the anchors. To hold the anchors in fixed peripheral adjustment upon the plates, each of the latter has in one of its edges the recess 13 which is engaged by the end of a thumb screw 14 threadedly engaging the anchor.

To apply the expanding and contracting tool, the anchors 8 are longitudinally slid over the plates 12 until the recesses 13 in the plates register with the inner ends of the thumb screws 14 when the latter are tightened down. Rotation of the threaded member 11 in one direction will force the anchors away from each other and consequently the ends of the main section of the demountable rim; while rotation in the opposite direction will move the anchors toward each other and with the anchors, the ends of the main section. Relative angular movement of the threaded member 11 and the anchors 8 due to the movements of the anchors away from and toward each other is taken care of by the pivots 9 extending transversely of and journalled in the bifurcations upon the anchors.

What I claim as my invention is:

In a rim expanding and contracting tool, the combination with a pair of anchors detachably engageable with members having undercut side edges and recesses, said members being secured to a transversely split rim section near its ends, said anchors having their lower faces of substantially the same radius of curvature as the rim section and having dove-tailed channels for detachable engagement with said members, means upon said anchors for holding the same in fixed peripheral adjustment upon said members, said means including threaded members upon said anchors engageable in the recesses of said members, transversely extending pivots journaled in said anchors, and a rod secured to one of said pivots and threadedly engaging the other for moving the anchors away from or toward each other.

In testimony whereof I affix my signature.

WILLIAM N. BOOTH.